No. 654,102.  
R. H. McHARDY.  
KNOB ATTACHMENT.  
(Application filed Dec. 21, 1899.)  
Patented July 17, 1900.

(No Model.)

WITNESSES.  
Charles T. Hannigan  
Francis W. Day

INVENTOR.  
Rudolph H. McHardy  
By Horatio E. Bellows  
Atty.

UNITED STATES PATENT OFFICE.

RUDOLPH H. McHARDY, OF PROVIDENCE, RHODE ISLAND.

KNOB ATTACHMENT.

SPECIFICATION forming part of Letters Patent No. 654,102, dated July 17, 1900.

Application filed December 21, 1899. Serial No. 741,196. (No model.)

*To all whom it may concern:*

Be it known that I, RUDOLPH H. McHARDY, a subject of the Queen of Great Britain, residing at Providence, in the county of Providence and State of Rhode Island, have invented a certain new and useful Improvement in Door-Knob Attachments, of which the following is a specification, reference being had therein to the accompanying drawings.

My invention relates to that class of fastening devices for door-knobs wherein a threaded sleeve moves upon the spindle. Its objects are to secure an effective means of attachment and a perfect interaction of parts, which are attained by the novel construction and arrangement of parts hereinafter described.

Figure 1:
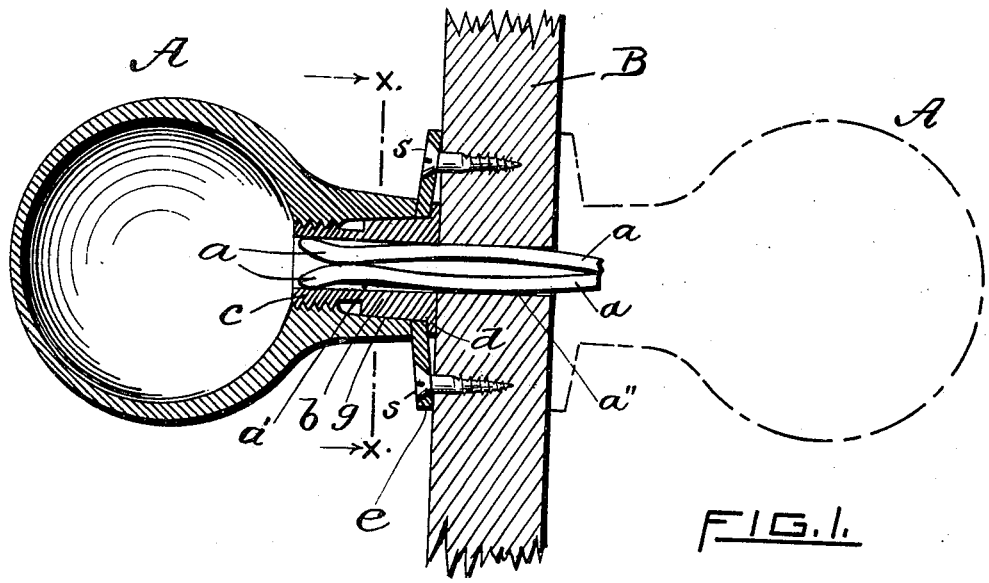
Figure 6:
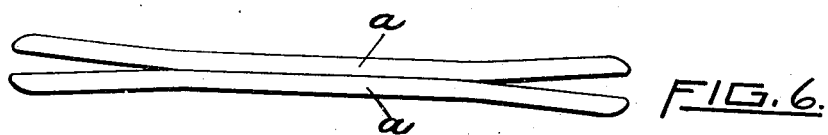
Figures 2, 3, 4, 5:
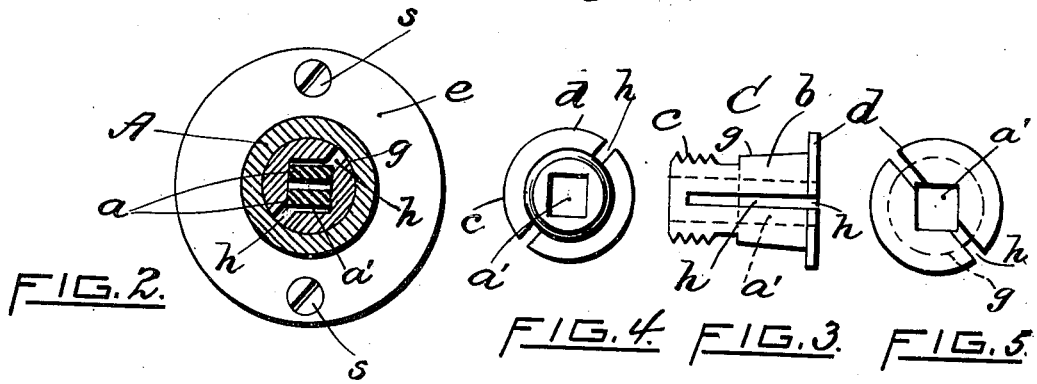

Figure 1 is a vertical section of my knob attached to a door with its companion in broken outline; Fig. 2, a sectional view of the knob on line $x\,x$ of Fig. 1. Fig. 3 is a side view of the sleeve member, and Figs. 4 and 5 end views of the same. Fig. 6 is a side elevation of the spindle members in relaxed position.

The construction of my device is as follows: The spindle is composed of two members $a\,a$, which in cross-section are parallelograms. These strips have their outer extremities beveled or rounded, and when relaxed their ends slightly diverge, as shown in Fig. 6. Around the spindle members is a sleeve C, with a rectangular bore $a'$ sufficiently large to admit the lateral movement of said spindle members therein.

In detail the sleeve has a flange $d$ upon one end and an exterior thread $c$ on the other. A longitudinal slot $h$ pierces the sleeve nearly its full length. For some distance from the flange $d$ the exterior of the sleeve-body $b$ gradually tapers, as at $g$, Fig. 3.

The interior neck of the knob A is threaded some distance to engage with the sleeve-thread $c$, and thence tapers to a degree slightly less than $g$ to move upon the cone-shaped portion $b$ of the sleeve C.

A collar $e$ is fixed by any suitable fastening means, as screws $s\,s$, to the door and secures the sleeve thereto by its flange $d$.

The parts may be assembled by first affixing the collar engaged with the flange to the door. Next compress with pliers or otherwise the two adjacent ends of the spindle members $a\,a$ to allow their insertion into the bore $a'$ of the sleeve and insert the same until they assume the position shown in Fig. 1. The knob A is then engaged, and as its neck extremity advances over the portion $b$ of the sleeve the contraction of sleeve-segments will force the spindle members to separate at their center and extremities, thereby securing a permanent frictional engagement with the sleeve and with any locking device which may be located around the passage through the door.

Having thus described my invention, what I claim as new, and desire to secure by Letters Patent, is—

In combination with a door-knob having an interiorly threaded and tapered neck, of a spindle consisting of two parallel members rectangular in cross-section with slightly-diverging extremities, a threaded split internally-tapered sleeve provided with a flange surrounding said spindle and adapted to bear upon said members when the threaded neck is engaged by the sleeve, and a collar engaging said flange to hold the sleeve in position against the door.

In testimony whereof I affix my signature in presence of two witnesses.

RUDOLPH H. McHARDY.

Witnesses:
EMELYN I. TAFT,
HORATIO E. BELLOWS.